United States Patent Office 3,513,135
Patented May 19, 1970

3,513,135
ANIONIC POLYMERIZATION OF A LACTAM IN THE PRESENCE OF N-MONO SUBSTITUTED CARBOXYLIC ACID AMIDES
Karl-Heinz Hermann, Krefeld-Bockum, and Hermann Schnell, Krefeld-Uerdingen, Germany, assignors to Farbenfabriken Bayer Aktiengesellschaft, Leverkusen, Germany, a corporation of Germany
No Drawing. Continuation of application Ser. No. 498,149, Oct. 19, 1965. This application May 7, 1969, Ser. No. 824,375
Claims priority, application Germany, Dec. 10, 1964, F 44,663
Int. Cl. C08g 20/18
U.S. Cl. 260—78       5 Claims

ABSTRACT OF THE DISCLOSURE

Process of preparing polyamides characterized by their increased thermal stability and improved flowability comprising polymerizing an anhydrous lactam with an alkali catalyst and a polymerization accelerator in the presence of an N-mono-substituted carboxylic acid amide at a temperature from 100 to 350° C.

---

This application is a streamlined continuation of Ser. No. 498,149, filed Oct. 19, 1965.

This invention relates to a process for the production of polyamides having improved thermal stability and improved flow or rheologic properties by ionically polymerizing anhydrous lactams in the presence of carboxylic acid amide.

It is known that anhydrous lactams of ω-amino-carboxylic acids can be polymerized anionically in the presence of alkaline catalysts, such as alkali or alkaline earth metal or their hydrides, oxides, hydroxides, carbonates and alcoholates, at relatively high temperatures to form linear polyamides of high molecular weight.

By adding conventional polymerization accelerators, such as isocyanates or compounds splitting off isocyanates, carbodiimides or cyanamides (for example, in accordance with the process of German patent specification No. 1,067,591) or acid derivatives, such as benzoylchloride, terephthaloyl chloride, etc., the polymerization velocity can be increased and/or the polymerization temperature can be lowered.

However, when using the said polymerization accelerators, it is generally polyamides with a very high melt viscosity which are formed. As a result, both the production of the polyamides by this process in intermittent and continuous apparatus at temperatures above the melting point of the polyamide, (for example at 210 to 290° C. in the case of polycaprolactam) and the processing of the polyamide melt, e.g., in injection-molding machines, spinning machines and extruders, is made considerably more difficult and sometimes impossible.

The addition of chain-breaking agents such as amines has been proposed for eliminating these difficulties.

However, these compounds all have the disadvantage that they disturb the normal progress of the polymerization, since they are able to react with the polymerization accelerators, e.g., isocyanates, carbodiimides or acid halides, and as a result at least partially inactivate the said accelerators.

It has now been found that, by anionic polymerization of anhydrous lactams with addition of polymerization accelerators, it is possible to obtain polyamides of high molecular weight with reduced melt viscosity and consequently improved flowing power if N-monosubstituted carboxylic acid amides are added to the lactams prior to the polymerization. These carboxylic acid amides can also contain several acid amide groups in the molecule and correspond to the general formula

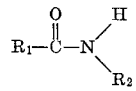

wherein $R_1$ and $R_2$ represent an alkyl group with 1 to 20 carbon atoms, a cycloalkyl group or an aryl group, which groups optionally contain other substituents, such as tertiary amino groups, ether groups, sulphite groups, nitrile groups or carboxylic acid amide groups.

By way of example, the following carboxylic acid amides are suitable for carrying out the process according to the invention: N-octadecyl acetamide, N-octadecyl benzamide, N-octadecyl stearic acid amide, N,N'-didodecyl adipic acid amide, N,N'-dioctadecyl terephthalic acid amide, N-methyl stearic acid amide, N-phenyl stearic acid amide, ε-N,N-dimethylamino caproic acid octadecyl amide, N-cyclohexyl palmitic acid amide, N-butyl lauric acid amide, N-dodecyl-p-methoxy benzoic acid amide, N-methyl-acetamide, N-butyl benzamide and distearoyl hexamethylene-diamine, N-cyclohexyl-stearic acid amide, N-butyl-stearic acid amide, ε-N,N-dimethylaminocaproic acid dodecyl amide.

The said compounds are generally added in quantities of 0.01 to 10 mol percent and advantageously 0.1 to 1 mol percent, calculated on the lactam.

The polyamides produced according to the invention do not show any substantial rise or fall in the melt viscosity, even when heated for a relatively long time to above the melting point, but the said viscosity remains practically constant.

For the polymerization, the anhydrous lactams are mixed with an alkaline catalyst (for example, the sodium compound of C-methyl caprolactam) a polymerization accelerator (for example, stearyl isocyanate) and an N-monosubstituted carboxylic acid amide in the usual way, and heated to temperatures between approximately 100 and approximately 350° C. The polymerization is carried out in the absence of moisture and oxygen.

The polymerization can be conducted both in intermittently operating apparatus, e.g., stirrer-type autoclaves, and in continuously operating apparatus, e.g., heated tubes, without any difficulties arising, since the polyamide melt formed remains capable of being stirred, because of its lowered melt viscosity, and the pressure set up in the tubes are not too high.

The polyamides which are obtained and which may optionally also contain other substances, such as age resisters, stabilizers, pigments, dyestuffs, fillers and the like, are excellently suitable for the production of fibres, bristles, finely divided shaped elements, foils, etc., on account of their good flow behaviour.

The following examples are cited to illustrate the invention.

EXAMPLE 1

190 g. of ε-caprolactam are mixed with 0.66 g. of stearyl isocyanate (0.15 mol percent) and 1.6 g. of N-octadecyl stearic acid amide (0.2 mol percent) and are melted with exclusion of oxygen. 20 g. of ε-caprolactam are distilled off in vacuo at a temperature of 150 to 160° C. in order to remove traces of water. The ε-caprolactam is then heated to 250° C. in the absence of moisture and oxygen. After adding 0.6 ml. of a 2.7-normal solution of the sodium compound of C-methyl caprolactam in diisopropyl benzene (corresponding to 0.1 mol percent of sodium compound), the polymerization is initiated within 30 to 60 seconds and a tough viscous melt which can be satisfactorily stirred is formed, and this melt is further stirred for 1 hour at 270° C. After cooling, comminuting, extracting and drying, a colorless polyamide is obtained with the relative viscosity $\eta_R$ (measured from a 1% per unit by weight solution in m-cresol at 25° C. in an Ubbelohde viscosimeter) of 3.00 and the melt viscosity of 10,000 poises at 250° C. On addition of 3.2 g. of N-octadecyl stearic acid amide (0.4 mol percent), a polyamide is obtained which has the relative viscosity of 2.80 and the melt viscosity of 4000 to 5000 poises, measured from the polymeric melt at 250° C. in a capillary-pressure-viscosimeter. A comparison test without adding N-octadecyl stearic acid amide produces, after initiation of the polymerization a blistery elastomeric product which can no longer be stirred. It has the relative viscosity ($\eta_R$) of 3.55 and a melt viscosity higher than 100,000 poises.

The yield is 87% in all cases, based on the monomer.

EXAMPLE 2

190 g. of ε-caprolactam are mixed with 1.85 g. of N,N-dimethyl - ε - aminocaproic acid octadecyl amide (0.3 mol percent) and melted in the absence of oxygen. At a temperature of 160–170° C., 20 g. of ε-caprolactam are distilled off in vacuo in order to remove traces of water. 710 mg. of stearyl isocyanate (0.16 mol percent) are then added and the melt is heated to 240° C. in the absence of moisture and oxygen. After adding 0.6 ml. of a 2.7-normal solution of sodium compound of C-methylcaprolactam in diisopropylbenzene (corresponding to 0.1 mol percent of sodium compound), the polymerization starts after 30 seconds and a tough viscous melt which can be satisfactorily stirred is obtained, and this is stirred for another hour at 270° C. After cooling, comminuting, extracting and drying, a colorless polyamide is obtained with a relative viscosity ($\eta_R$) of 2.85 and a melt viscosity of 3500 poises, which has risen insignificantly to 4300 poises after heating for 2 hours at 250° C.

With an addition of 2.54 g. of N,N-dimethyl-ε-aminocaproic acid octadecyl amide (0.4 mol percent), a polyamide is obtained which has a relative viscosity $\eta_R$ of 2.80 and a melt viscosity of 2300 poises. In this case, the melt viscosity rises to 2600 poises after heating for 2 hours at 250° C.

A comparison test without adding N,N-dimethyl-ε-amino-caproic acid octadecyl amide produces, after polymerization, a blistery elastic product which can no longer be stirred. It has the relative viscosity $\eta_R$ of 3.70 and a melt viscosity of 75,000 poises, and this has risen to more than 100,000 poises after heating for 2 hours at 250° C.

EXAMPLE 3

According to Example 1, 0.72 g. of N,N'-didodecyl-adipic acid amide (0.1 mol percent) are added to the polymerization mixture. A colorless polyamide being obtained having a relative solution viscosity $\eta_R$ of 2.91 and a melt viscosity of 8400 poises at 250° C.

EXAMPLE 4

According to the procedure of Example 1, 1.1 g. of N-cyclohexyl-stearic acid amide (0.2 mol percent) are added to the polymerization mixture. The obtained polyamide has a relative solution viscosity of 3.08 and a melt viscosity of 10,600 poises at 250° C.

We claim:
1. Process for the production of high molecular weight polyamides characterized by increased thermal stability and improved flowability comprising polymerizing anhydrous caprolactam with an alkali catalyst and a polymerization accelerator, in the presence of 0.1 to 1 mol percent of an N-mono-substituted carboxylic acid amide having the formula:

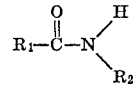

wherein $R_1$ and $R_2$ are each a member selected from the group consisting of $C_1$–$C_{20}$ alkyl, cycloalkyl and aryl, and such group members substituted by at least one member of the group of tertiary amino, ether, and carboxylic acid amide groups, as a chain interrupting agent at a temperature above the melting point of the polyamide to about 350° C.

2. Process according to claim 1, wherein said N-mono-substituted carboxylic acid amide is N-octadecyl stearic acid amide.

3. Process according to claim 1, wherein said N-mono-substituted carboxylic acid amide is N,N-dimethyl-ε-aminocaproic acid octadecyl amide.

4. Process according to claim 1, wherein said N-mono-substituted carboxylic acid amide is N-cyclohexyl stearic acid amide.

5. Process according to claim 1, wherein said N-mono-substituted carboxylic acid amide is N,N-didodecyl adipic acid amide.

References Cited

UNITED STATES PATENTS

| 3,015,652 | 1/1962 | Schnell et al. | 260—78 |
| 3,017,391 | 1/1962 | Mottus et al. | 260—78 |
| 3,057,830 | 10/1962 | Corbin | 260—78 |
| 3,037,003 | 5/1962 | Griehl | 260—78 |
| 3,211,706 | 10/1965 | Borner et al. | 260—78 |
| 3,359,227 | 12/1967 | Amann et al. | 260—78 |

FOREIGN PATENTS 1,386,866  12/1964  France.

HAROLD D. ANDERSON, Primary Examiner

U.S. Cl. X.R.

260—18, 32.6